2 Sheets—Sheet 1.
H. HAUPT.
Device for Slack-Water Navigation.
No. 225,125. Patented Mar. 2, 1880.
Fig. 1.
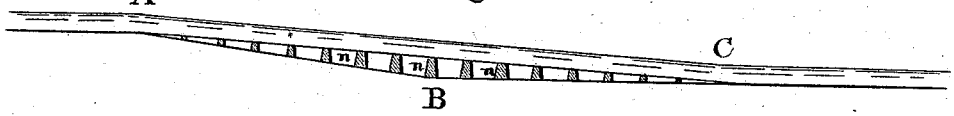
Fig. 2.
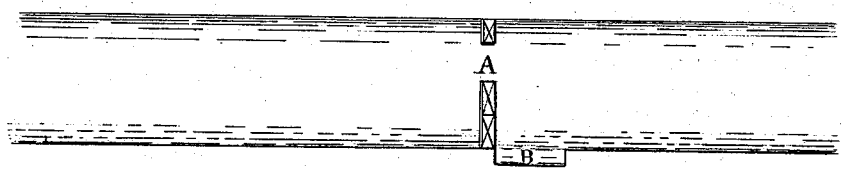
Fig. 3.     Fig. 4.     Fig. 5.
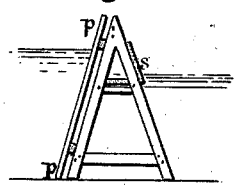 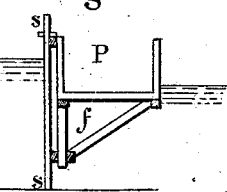 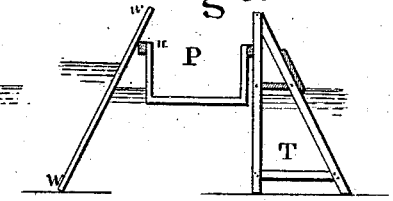
Fig. 6.
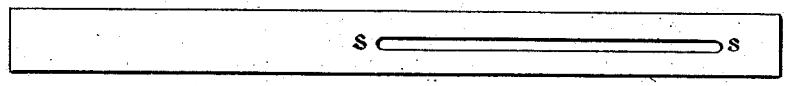
Fig. 7.
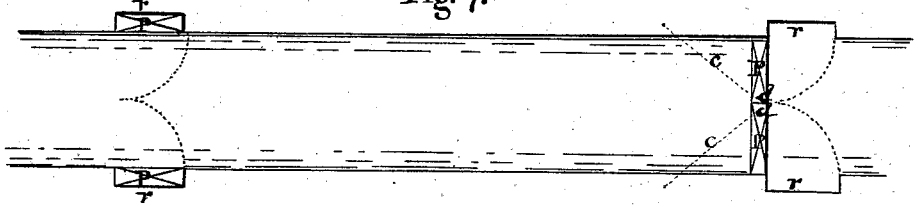
Witnesses:     Inventor:
Philip Haurg.     Herman Haupt
W. E. Williams     by A. Pollok Atty 2 Sheets—Sheet 2.
H. HAUPT.
Device for Slack-Water Navigation.
No. 225,125. Patented Mar. 2. 1880.
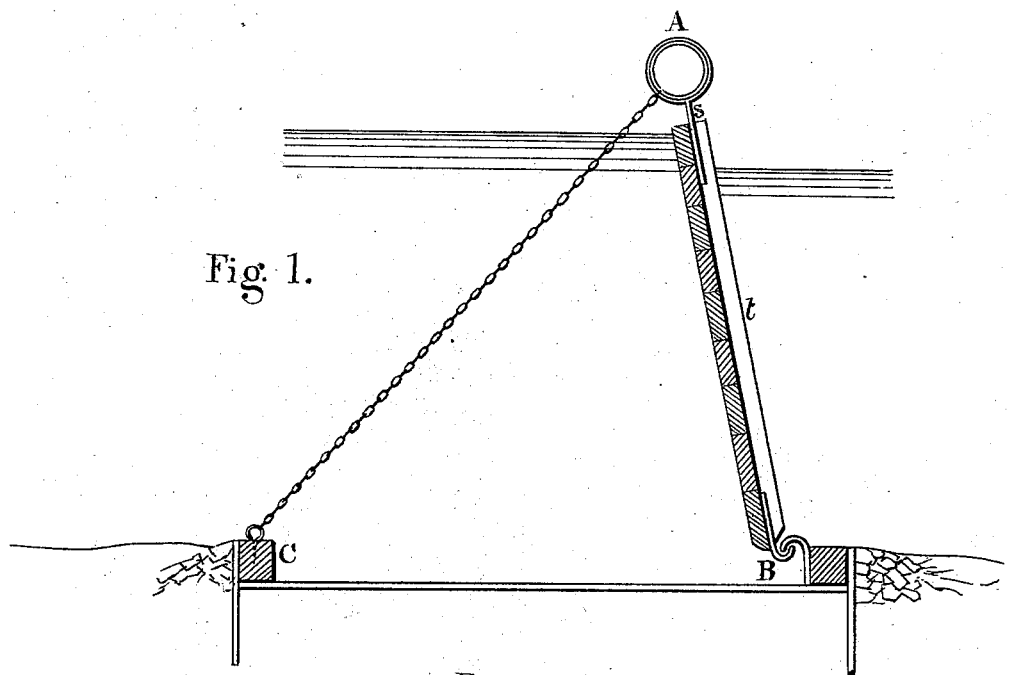
Fig. 1.
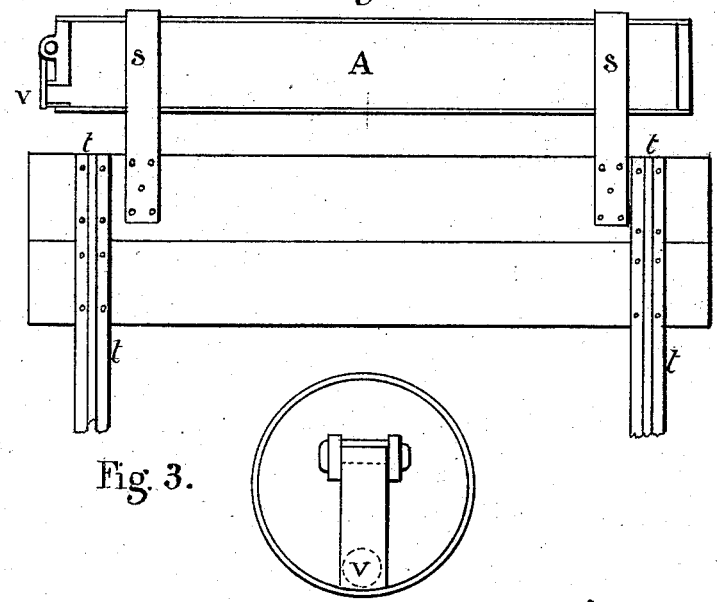
Fig. 2.
Fig. 3.
Witnesses:
Philip Mauro
C. A. Hedrick
Inventor:
Herman Haupt
by A. Pollok atty.
N. PETERS, PHOTO-LITHOGRAPHER, WASHINGTON, D. C.

UNITED STATES PATENT OFFICE.

HERMAN HAUPT, OF PHILADELPHIA, PENNSYLVANIA.

DEVICE FOR SLACK-WATER NAVIGATION.

SPECIFICATION forming part of Letters Patent No. 225,125, dated March 2, 1880.

Application filed December 29, 1879.

*To all whom it may concern:*

Be it known that I, HERMAN HAUPT, of the city of Philadelphia, in the State of Pennsylvania, have invented certain new and useful improvements for the purpose of rendering rivers navigable and for improving the navigation of such as are defective; and I do hereby declare the following to be a full, clear, and exact description of the invention, such as will enable others skilled in the art to which it pertains to construct and use the same.

This invention consists in the application and combination of three principles in hydraulics, and in the construction, arrangement, and contrivances by which they can be utilized, the effect of which is, that a supply of water entirely insufficient to furnish any kind of satisfactory navigation may be so economized and utilized as to permit large steamers and floats to be promptly transported without the delays incident to locks and dams, without the aid of reservoirs, and at less cost for construction and operation than by any other system of improvement.

The hydraulic principles referred to are, first, the depth of water in a channel can be increased by reducing its width; second, the depth of water in a channel can be increased and the velocity and discharge in a given time reduced by diminishing its slope; third, the velocity of flow can be greatly reduced, and as a consequence the depth increased and maintained, by contractions in the width of the channel at proper intervals.

The Ohio river from Pittsburg to Louisville will furnish an illustration of the application of these principles. The discharge of the Ohio river at Pittsburg at its zero or lowest stage is one thousand six hundred and sixty-six cubic feet per second, which is insufficient for any navigation whatever in the natural channel. I apply the first principle by contracting the width of the channel from its natural bed, which is about one thousand three hundred feet, to three hundred feet by building a mound like an ordinary canal-bank, faced with stone or other protective material, parallel to the line of shore, and at the proper distance, the water being turned into it by a low dam at the head of the mound; but as the fall of the river at some of the shoals is so steep that the minimum discharge would not give in the contracted channel more than one foot of water, it becomes necessary to apply the second principle by reducing the slope within the contracted channel. This reduction of slope may be effected either by excavation or embankment, or both; but as excavation of hard material under water is expensive, it is not proposed to resort to it in general, but to diminish the slope by embankment, bringing the bottom of the channel to any grade line desired. For example, if the natural fall should be four feet in one mile, and it should be desired to reduce the inclination to two feet in one mile, it would require two miles of such slope to overcome the fall of four feet, and the maximum fill would be two feet in depth at the end of the first mile; but it is not necessary that the whole channel, three hundred feet wide, should be filled with material to the line of the new grade. Cross-banks only are required at proper intervals, extending as high as the plane of grade of the intended bottom of the channel at such distances that the difference of level between two consecutive banks at the grade-line of the bottom will not exceed, say, one or two inches. The undulation of the surface of the water in passing these banks will be so slight as to be almost imperceptible, and cannot retard ascending navigation, while the dead-water between the banks will form a receptacle for deposits, and the river itself will thus be made to do the work of filling up to the new grade-line of the bottom; but even with this reduction of slope from four to two feet to the mile, the minimum discharge of one thousand six hundred and sixty-six feet per second would give less than one foot and a half depth in a channel three hundred feet wide with a slope of two feet per mile, and it becomes necessary to apply the third principle of contractions at proper intervals. This is believed to be an entirely new principle as applicable to river navigation, and one of great importance, as by means of it the minimum supply of one thousand six hundred and sixty-six feet per second is amply sufficient to maintain not only six feet, but even ten feet, depth of water in a channel three hundred feet wide without aid from reservoirs, and with no locks or other obstructions to navigation or sources of delay in either direction.

By contracting the channel at proper intervals and to a sufficient extent any desired depth of water may be secured, and if the obstructions placed across a portion of the channel for the purpose of contracting it were designed to be permanent there would be no necessity for reducing the slope of the bed. The obstructions, however, are not permanent. They are designed to be but temporary, to increase and maintain a depth sufficient for navigation in extreme low water, and to be removed when the water rises. In this view the reduction of the maximum slopes is desirable, as the obstructions which produce the contractions will be required for a shorter interval of time only.

In the improvement of the Ohio river I propose to place the obstructions to produce contractions at intervals corresponding to a fall of one foot. This will be at an average distance of one mile apart between Pittsburg and Wheeling, and of two miles between Wheeling and Louisville.

To place and remove rapidly and conveniently the obstructions used to contract the channel, dam back the water, reduce velocity of discharge, and increase depth, numerous devices may be used, several of which I will enumerate.

Temporary trestles faced with planks, or adjustable wickets similar to those used in the Chanoine or French dams, or floating pontons, or other floating structures, held in position by anchors or braces, and with sheeting-plank on the upper side to close the opening; or the opening may be closed by wickets hinged on the upper side of the pontons and tilted in an inclined position, so that the lower ends of the wickets will rest on the bottom.

If pontons or other floats should be used, recesses must be provided for them on the side of the channel, where they may lie secure from ice and drift when not in use. But although numerous devices and expedients may be employed to produce the required contraction of the channel, there is one system which I prefer to all others that have yet been presented, and which I will now proceed to describe. The drawing in illustration thereof will be found on Plate 2.

Instead of using pontons carrying plank on the upper side to obstruct the flow of the water, as represented in Plate 1, a preferable mode of accomplishing this object is shown in Plate 2, in which Fig. 1 represents a section in the direction of the channel, and Figs. 2 and 3 details of construction.

$t\ t\ t$ represent gates or wickets, which are hinged at the bottom, so that they can turn freely when necessary. These gates, when in position side by side, form a continuous line to close and contract the passage so far as may be desired.

They are made of plank bolted to T-irons, and so calculated that the weight of the whole wicket will be less than that of an equal volume of water, so that the wickets will float. They are placed in position slightly inclined up stream, and held by chains A C. The upper links of the chains should be open rings or links weaker than the balance of the chain, so that if struck by descending craft and broken the broken part will be out of water and readily repaired by the substitution of another link of chain or a ring.

A represents a sheet-iron cylinder, the office of which is both to give buoyancy to the wicket, and on the other hand, when needed, to cause the wicket to sink automatically, and thus remove the obstruction. For this purpose a number of small holes are made in the top of the cylinder, so small that when the cylinder is submerged a considerable period of time will be required to admit sufficient water to cause the cylinder and the wicket to which it is attached to sink; but if submerged for several hours so much water would enter the cylinder that it would become heavier than water and sink into the recess C B, where it would remain secure against damage by drift or ice until the next period of low water required that the wickets should be again erected.

By means of this contrivance a very important advantage is secured, which is, that ascending steamers and barges are not required to pass through the opening left for descending crafts, but can go up stream over the tops of the wickets, and thus avoid any detention whatever.

When a boat passes over the wickets a number of sections equal to its breadth will be pushed gently under water, remain submerged for a brief period—seldom more than a minute—and will then rise again into position when the craft has passed. The water which may have entered the cylinder during the period of immersion will, so soon as the wicket rises, escape through the valve V, which opens outward.

When the water rises sufficiently to fill the channel without the use of the contractions, it will then flow over the tops of the cylinders, which will fill with water and drop to the bottom, where they will lie in safety until again required.

Other metals can be substituted for iron and other material for plank; but as wood under water does not decay it is cheapest and best. Metals under water should be non-corrosive.

The wickets can be so constructed, as shown in the drawings, that they can be readily unshipped if broken, and others substituted while under water.

Cases may arise where the supply of water is still smaller, so small that no opening can be left, or but a very small one. I then propose to use the pontons as floating lock-gates. The opening should be contracted, by plank resting on the bottom or otherwise, to the smallest width necessary for the required navigation. The remaining opening I close by pontons carrying planks, which are suspended by pins or otherwise, and the lower ends hang just far enough above the bottom to allow the pontons to float or to discharge under them the minimum flow of the channel.

It must be observed that if the opening should not be properly adjusted to the required depth of water the tendency of the arrangement will be to automatically adjust itself, for if too much water passes the pontons will sink and contract the opening, and if too little they will rise and increase it.

The pontons can be maneuvered by means of a windlass and cable, and can be removed by swinging around one corner as a hinge when a boat approaches.

If the general channel should be wide and the fall at the contraction only one foot or less, very little water can be lost in the passage of a boat, for so soon as the boat enters the opening it closes it, and it remains closed, or nearly so, during the passage, after which the ponton is returned to close the opening; but there may be extreme cases in providing navigation on small streams, where no unnecessary loss of water can be permitted and only a lock will fulfill the required conditions during the period of excessive drought. The system here proposed has flexibility to meet even these requirements. The contractions by obstructions can be extended to close the channel entirely, and two such contractions can be placed at short intervals apart, corresponding to the length of a lock and floating pontons used at both as lock-gates, one set being closed when the other set is opened, this system having the advantage over permanent locks that the floating gates can be removed entirely from the channel when the supply of water permits their use to be dispensed with.

Explanation of Plate 1: A B C, Figure 1, represent the original channel in longitudinal section, the slope A B being supposed four feet to the mile. A C represent a reduced grade-line for the bottom of the improved channel, with a slope of two feet to the mile. n n n n represent low banks across the channel at intervals of two hundred to four hundred feet, terminating at the plane of the new grade, the difference of level between two successive banks to be not exceeding, say, two inches.

Fig. 2 represents a plan of a portion of the channel, showing a contraction at A, which contraction may be either by a permanent wall or bank, or by temporary trestles, pontons, or wickets. B is a recess in the bank, to hold the pontons when not in use.
Fig. 3 represents a cross-section of a trestle, against which sheet-planks p p are placed to obstruct the flow of water. A platform, S, may be attached, on which stones can be placed to prevent the trestles, if of wood, from floating, and the down-stream legs of the trestles should be inclined sufficiently to brace securely.

Fig. 4 represents a ponton, P, to the bottom of which a frame, f, is attached, to support the sheeting-planks S S, used to obstruct the flow, as in No. 3. The tendency to tilt can be counteracted by stones placed on the lower side of the ponton.

Fig. 5 shows another mode of closing the opening by means of inclined wickets w w, hinged on the edge u of a ponton, P, play being provided to accommodate slight changes of level, caused by waves of passing steamers or from other causes, by a slot, s s, in each of the wickets or planks, Fig. 6, and by sliding vertically along the face of the anchoring-trestle T, Fig. 5.

Fig. 7 represents a lock with floating gates, formed by placing two pontons as gates at each end, one set being closed while the other set is opened. These pontons can be maneuvered by a cable, c, and capstan d in each.

The upper side of each ponton is closed by plank or wickets, as in Fig. 4, suspended so as to give a clearance of an inch or more at bottom. r r r r are recesses, into which the pontons are floated when not in use or when gates are open. Such locks are proposed only as temporary expedients to retard the flow and save water in open channels in periods of extreme drought, and to overcome falls of only one or two feet.

What I claim as my invention, and desire to secure by Letters Patent, is—

1. The method of improving the navigation of rivers, which consists in combining the three expedients hereinbefore described, to wit: first, a reduced width of channel by a bank or mound constructed in a general direction parallel to the shore-line; second, the reduction of the slope by solid filling, or by cross banks or walls the tops of which are in the plane of the required grade, leaving the intervening spaces to be gradually filled by deposits; and, third, the application of successive temporary contractions in the general width of the channel, substantially as described.

2. The method of reducing the velocity of discharge and of increasing the depth of water for navigation, which consists in arranging temporary contractions, automatically removable, at greater or less intervals, dependent on the fall of the stream, substantially as described.
3. The method of improving the navigation of rivers subject to seasons of extreme low water, which consists in arranging therein temporary and automatically-removable obstructions, to contract the channels during said low stage of water, as and for the purpose set forth.

4. As a means of temporarily contracting the channel of water-courses, wickets hinged at the bottom and surmounted by a perforated hollow box or cylinder on top, which box or cylinder will rise after temporary immersion, keep the wicket erect, and discharge the water that may have entered through a valve or opening, but which, after longer immersion, will fill with water, throw down the wicket automatically, and thus without human vigilance or attention protect the wickets from injury from ice or drift, substantially as described.

5. A series of hinged wickets, in sections, which will yield to the pressure of craft passing up stream and oppose but feeble resistance in that direction, but will arrest or retard the flow of water down stream, and thus increase its depth, substantially as described.

6. A series of wickets provided with hinges at the bottom and hollow cap at the top, substantially as described, to close a section of a dam or weir in low water, and which will sink and remove themselves when the water reaches a given height.

7. The method of improving the navigation of streams subject to periods of extreme low water, which consists in dividing such watercourses during said low stages into a succession of temporary locks by means of temporary floating gates, substantially as described.

In testimony whereof I have signed this specification in the presence of two subscribing witnesses.

HERMAN HAUPT.

Witnesses:
   A. POLLOK,
   PHILIP MAURY.